US009618650B2

(12) United States Patent
Kikuchi et al.

(10) Patent No.: US 9,618,650 B2
(45) Date of Patent: Apr. 11, 2017

(54) MULTIPLE OPTICAL AXIS PHOTOELECTRIC SENSOR FOR MUTING PROCESSING

(71) Applicant: OMRON CORPORATION, Kyoto (JP)

(72) Inventors: Keisaku Kikuchi, Kyoto (JP); Kazunori Osako, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 171 days.

(21) Appl. No.: 14/625,745

(22) Filed: Feb. 19, 2015

(65) Prior Publication Data

US 2015/0301221 A1    Oct. 22, 2015

(30) Foreign Application Priority Data

Apr. 18, 2014    (JP) .................. 2014-086195

(51) Int. Cl.
| | | |
|---|---|---|
| G01V 8/20 | (2006.01) | |
| G01V 8/10 | (2006.01) | |
| G01S 17/00 | (2006.01) | |
| F16P 3/14 | (2006.01) | |

(52) U.S. Cl.
CPC .............. *G01V 8/20* (2013.01); *F16P 3/144* (2013.01); *G01S 17/00* (2013.01); *G01V 8/10* (2013.01)

(58) Field of Classification Search
CPC ... G01V 8/20; G01V 8/10; F16P 3/144; G01S 17/00; G01B 8/12
See application file for complete search history.

(56) References Cited

U.S. PATENT DOCUMENTS

| 6,979,814 B2 | 12/2005 | Kudo et al. |
| 8,947,652 B2 | 2/2015 | Ohmae et al. |
| 2003/0146373 A1 | 8/2003 | Kudo et al. |

(Continued)

FOREIGN PATENT DOCUMENTS

| JP | 2003-218679 | 7/2003 |
| JP | 2010-38588 | 2/2010 |

(Continued)

OTHER PUBLICATIONS

U.S. Appl. No. 14/625,989 to Keisaku Kikuchi et al., filed Feb. 19, 2015.

*Primary Examiner* — Francis M Legasse, Jr.
(74) *Attorney, Agent, or Firm* — Greenblum & Bernstein, P.L.C.

(57) ABSTRACT

A multiple optical axis photoelectric sensor capable of performing muting processing adapted to a plurality of kinds of workpieces having different heights without the need for complicated pre-setting according to the kinds of workpieces, is provided. The multiple optical axis photoelectric sensor is provided with a light projecting device and a light receiving device, which forms a plurality of optical axes together with the light projecting device. In at least one portion of a detection area, which is set according to the optical axes, a muting area for nullifying the result of detection of blocked light is set up. A sensor system acquires a range of blocked light corresponding to the blocked optical axis during passage of a workpiece, and alters the muting area of the multiple optical axis photoelectric sensor from a first range to a second range.

11 Claims, 13 Drawing Sheets

(56) References Cited

U.S. PATENT DOCUMENTS

| | | | |
|---|---|---|---|
| 2009/0058642 A1* | 3/2009 | Fukumura | G01V 8/20 340/556 |
| 2013/0270423 A1* | 10/2013 | Kawabata | G01V 8/20 250/208.2 |
| 2014/0001345 A1 | 1/2014 | Tsuzuki et al. | |
| 2014/0002264 A1 | 1/2014 | Kikuchi et al. | |
| 2014/0028436 A1 | 1/2014 | Osako et al. | |
| 2014/0131555 A1 | 5/2014 | Iida et al. | |

FOREIGN PATENT DOCUMENTS

| | | |
|---|---|---|
| JP | 2012-134575 | 7/2012 |
| JP | 5229310 | 7/2013 |

* cited by examiner

MULTIPLE OPTICAL AXIS PHOTOELECTRIC SENSOR FOR MUTING PROCESSING

TECHNICAL FIELD

The present invention relates to a multiple optical axis photoelectric sensor.

BACKGROUND ART

An ordinary multiple optical axis photoelectric sensor is provided with a light projecting section in which a plurality of light projecting elements are arranged in a row, and a light receiving section in which the same number of light receiving elements as the light projecting elements are arranged in a row. The light projecting elements and the light receiving elements are disposed to face each other in a one-to-one relationship in such a way as to set up a detection area by a plurality of optical axes.

The light projecting section turns on the light projecting elements in sequence. The light receiving section abstracts amounts of light received at respective light receiving elements from the light receiving elements corresponding to respective light projecting elements, at timings that are synchronized with the light emission operation of the light projecting elements. With this configuration, the light blocking states of the optical axes of the multiple optical axis photoelectric sensor are detected respectively. The light receiving section determines whether or not an object is present in the detection area by utilizing the detection results for the respective optical axes, and outputs a signal indicating the determination result. For the purpose of synchronizing the light projecting section with the light receiving section, the light projecting section and the light receiving section are connected to each other by way of a communication line. Alternatively, the light projecting section and the light receiving section may be synchronized with each other by means of optical communication between the light projecting section and the light receiving section.

The multiple optical axis photoelectric sensor is disposed as a device for assuring worker's safety in a production site, for example. Production equipment will stop operating, when a light blocking state is detected in any of the optical axes in the detection area of the multiple optical axis photoelectric sensor. Depending on the production apparatus, there is a case that the detection area of the multiple optical axis photoelectric sensor must be provided in a transport path for passing therethrough workpieces to be processed or already processed workpieces. However, the productivity will be reduced when the production apparatus stops operating because of blocking the optical axis by a workpiece.

Conventionally, as a function for achieving a good balance between safety and productivity in the production site, a muting function has been utilized often for temporarily deactivating the safety function of the multiple optical axis photoelectric sensor. However, in recent years, with the advancement in usage, productivity and safety are required for complicated workpiece forms, conventional evenly shaped workpiece forms and combinations thereof, for example.

In general, the muting function deactivates the entire detection area only when two muting signals independent from sensors and switches are output in an appropriate sequence. Therefore, the conventional muting function generally deactivates the entire detection area including other areas than the area to be deactivated, leading to a non-preferable state.

For example, JP 2003-218679A discloses a multiple optical axis photoelectric sensor aimed to achieve a good balance between a light blocking object detection function and a muting function. This multiple optical axis photoelectric sensor is provided with a muting area setting means for setting, by teaching, an area where the muting function is activated. The muting area setting means activates the muting function only to some areas of a light curtain.

In the multiple optical axis photoelectric sensor disclosed in JP 2003-218679A, when the height (size) of workpieces passing through the detection area is constant, it is possible to set up the area where the muting function is activated in accordance with the height of the workpiece. However, in applications where the height of workpieces varies, it is necessary to set up the area for the activation of the muting function in accordance with the maximum height of the workpieces.

Therefore, if the height of the workpieces passing through the detection area varies, there is still a problem of the deactivation of other areas than the areas intended to be deactivated. For example, such a problem may arise in case of conveying pallets carrying products together with pallets not carrying products. JP 2003-218679A discloses a feature of providing a plurality of muting areas in advance in the multiple optical axis photoelectric sensor for allowing users to set the muting area. However, it is difficult to adapt the muting area to the workpieces in accordance with the setting in case that workpieces having different heights are conveyed together.

JP-2010-385588A discloses a multiple optical axis photoelectric sensor that is switchable between two muting areas and a controller for the same. The controller stores the two muting areas in advance. The controller switches the muting areas in response to a detection signal output from a sensor. In this instance, a sensor is required for switching the muting areas. In addition, it is necessary to store a plurality of muting areas in advance.

JP-2003-218679A and JP-2010-385588A are examples of related prior art.

SUMMARY OF THE INVENTION

The present invention has an object to provide a multiple optical axis photoelectric sensor capable of performing a muting processing adapted to a plurality of kinds of workpieces having different heights.

The multiple optical axis photoelectric sensor according to one aspect of the present invention is a multiple optical axis photoelectric sensor for detecting an object to be detected which is conveyed by a conveyance device. The multiple optical axis photoelectric sensor is provided with a light projecting device having a plurality of light projecting sections which are arrayed in a line, a light receiving device having a plurality of light receiving sections which are disposed to face the light projecting sections, a light blocking determination section configured to perform a light blocking determination of whether or not any optical axes formed between opposed light projecting sections and light receiving sections are in a light blocking state, an output section configured to output a detection signal on the basis of a result of the light blocking determination, and a muting processing section configured to perform muting so as not to output the detection signal even though a subset or all of the optical axes are in a light blocking state, wherein the muting processing section comprises: a muting initiating section configured to initiate the muting of the optical axes in a first range in response to a signal input from an external muting device indicating that the object to be detected is conveyed toward the multiple optical axis photoelectric sensor, and a muting altering section configured to select, as the optical axes to be muted thereafter (after the selection by the muting altering section), the optical axes in a second range that includes a range of a subset or all of the optical axes of the first range and includes at least all blocked optical axes of the first range, depending on the light blocking state of the optical axes in the first range while muting the optical axes in the first range.

Preferably, the muting altering section is configured to acquire the range of the blocked optical axes of blocked light during an acquisition period for acquiring a blocked light range.

The acquisition period for acquiring the blocked light range can be initiated when any of the optical axes is blocked. The acquisition period for acquiring the blocked light range may be initiated by a trigger signal input from outside. In these cases, the length of the acquisition period for acquiring the blocked light range can be a fixed time, a set time, or a time that is determined in accordance with information indicating a speed, a length or a passage time of the detected object.

The acquisition period for acquiring the blocked light range can be controlled by a control signal input from outside.

Preferably, the second range targeted for the muting includes a maximum blocked light range, which is acquired during the acquisition period for acquiring the blocked light range. The second range can include an additional range corresponding to one optical axis added to either side of the maximum blocked light range.

The first range may be a range corresponding to all of the optical axes, or a range corresponding to a predetermined number of the optical axes.

Preferably, the muting processing section may further continue the second range to be muted according to the passage condition of the detected object.

Preferably, the multiple optical axis photoelectric sensor is further provided with a communication section for communication with a second multiple optical axis photoelectric sensor. The light projecting devices may be disposed in series together with light projecting devices of the second multiple optical axis photoelectric sensor. The light receiving devices may be disposed in series together with light receiving devices of the second multiple optical axis photoelectric sensor. When the communication section has been set to be capable of communicating with the second multiple optical axis photoelectric sensor, the output section is configured to be capable of outputting a detection signal by combining the result of the light blocking determination with a result of light blocking determination for the second multiple optical axis photoelectric sensor which is acquired by way of the communication section; the muting initiating section is configured to be capable of selecting the optical axes in a third range, which is the entire or a subset of an optical axis group including all of the optical axes and all of the optical axes of the second multiple optical axis photoelectric sensor, as optical axes to be muted; and the muting altering section is configured to be capable of selecting the optical axes in a fourth range, which includes a range of the blocked optical axes in the entire or a subset of the third range, as the optical axes to be muted thereafter, depending on the light blocking state of the optical axes in the third range while muting the optical axes in the third range.

According to the present invention, it is possible to provide a multiple optical axis photoelectric sensor enabling muting processing adapted to a plurality kinds of workpieces with different heights, without the need for complicated pre-setting according to the kinds of workpieces.

EMBODIMENTS OF THE INVENTION

Figure 1:
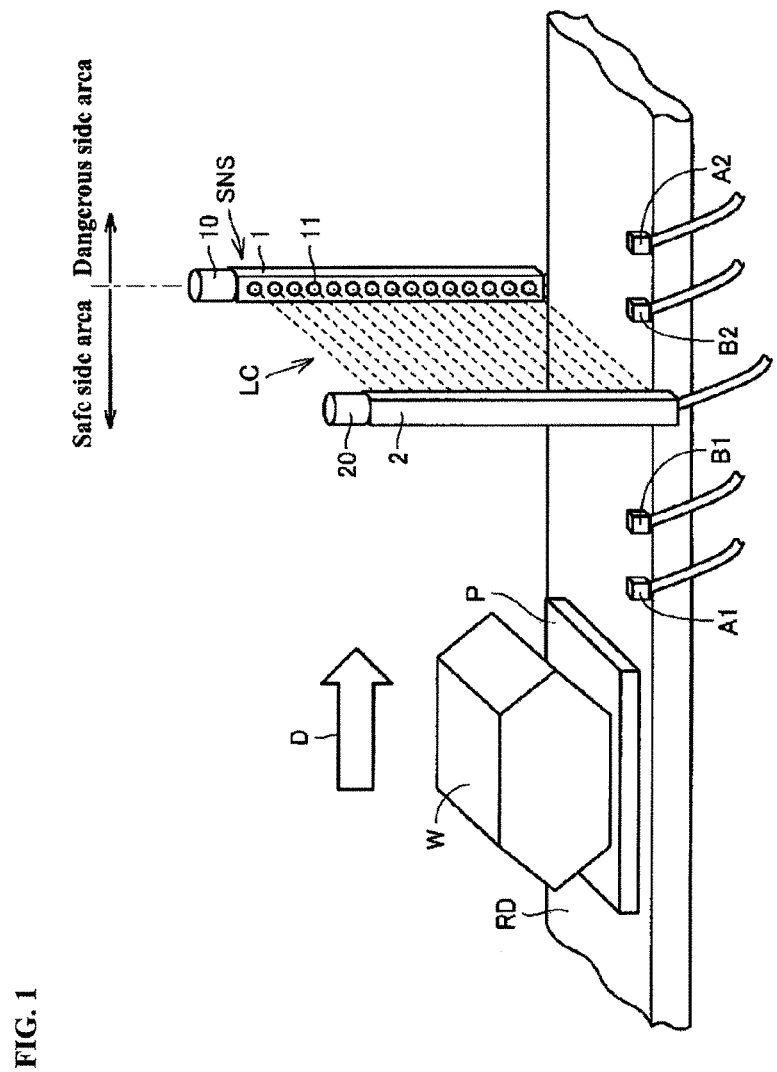
FIG. 1 is a view schematically showing a configuration example of a sensor system according to an embodiment of the present invention.

Hereinafter, embodiments of the present invention will be described in detail with reference to drawings. The same symbol in the drawings shows the same section or the corresponding section. In this description, unless specifically described, dotted lines representing the traveling direction of light beam in the drawings as well as those light beams are referred to as "optical axes" in this description.

Therefore, "blocked optical axis" has the same meaning as that light of the light beam represented by the optical axis is blocked.

FIG. 1 is a view schematically showing a configuration example of a sensor system according to an embodiment of the present invention. As shown in FIG. 1, the sensor system according to the embodiment of the present invention includes a multiple optical axis photoelectric sensor SNS. The multiple optical axis photoelectric sensor SNS includes a light projecting device 1 and a light receiving device 2, which are disposed to face each other. A transport path RD on which workpieces are conveyed is interposed between the light projecting device 1 and the light receiving device 2. In one example, the transport path RD is realized by a belt conveyer.

In FIG. 1, the direction in which the workpieces W are conveyed is indicated by an arrow D. In the example shown in FIG. 1, the workpieces W are conveyed while loaded on pallets P.

The light projecting device 1 has a plurality of light emitting elements 11 (light projecting sections) which are arrayed linearly. The light receiving device 2 has light receiving elements 21, which are light receiving sections disposed to face the light emitting elements 11. The number of the light receiving elements 21 (see FIG. 4) is the same as that of the light emitting elements 11. The plurality of light emitting elements 11 and the plurality of light receiving elements 21 are positioned in a one-to-one relationship. Therefore, it is possible to set up a two-dimensional detection area LC formed by a plurality of optical axes.

In the example shown in FIG. 1, in the direction for conveying the workpieces W, the upstream side from the detection area LC is designated as a "safe side area", while the downstream side from the detection area LC is designated as a "dangerous side area". The way of designating the "safe side area" and the "dangerous side area" are not limited to this way. For example, in the direction for conveying the workpieces W, there are also cases in which the upstream side from the detection area LC is designated as a "dangerous side area", while the downstream side from the detection area LC is designated as a "safe side area".

Muting sensors A1, B1 are provided in the safe side area. Muting sensors B2, A2 are provided in the dangerous side area. In the example shown in FIG. 1, the muting sensor A1 is disposed upstream of the muting sensor B1, with respect to the direction in which the workpieces W are conveyed. Meanwhile, the muting sensor A2 is disposed downstream of the muting sensor B2, with respect to the direction in which the workpieces W are conveyed. With this configuration, it is possible to appropriately detect intrusion of objects with the multiple optical axis photoelectric sensor SNS even in case the objects intrude in a direction opposite to the direction of the arrow D. The muting sensor B2 is disposed at a position (second position) closer to the multiple optical axis photoelectric sensor SNS than the position (first position) of the muting sensor A1.

The muting sensors A1, A2, B1, B2 are transmissive photoelectric sensors in one example. Each of the muting sensors A1, A2, B1, B2 is constituted by a light projecting device and a light receiving device which face each other with the transport path RD being interposed therebetween. Therefore, although not shown in FIG. 1, each of the muting sensors A1, A2, B1, B2 is provided with a light projecting device and a light receiving device disposed at opposite sides of the transport path RD.

The muting sensors are not limited to transmissive photoelectric sensors. Depending on the material of the workpiece W, it is also possible to employ reflective photoelectric sensors, proximity sensors or the like. Alternatively, it is also possible to use a device other than a sensor having the functionality of detecting objects.

The detection signal from the multiple optical axis photoelectric sensor SNS is output to a power source supply circuit (not shown) of a machine (for example, production facility) installed within the dangerous side area. When light is not blocked at all in the detection area LC, a signal indicating a state of "non-detection" is output from the multiple optical axis photoelectric sensor SNS. As one example, a signal with H (logical high) level may be output from the multiple optical axis photoelectric sensor. When at least a portion of light is blocked in the detection area LC, the detection signal from the multiple optical axis photoelectric sensor is switched from the state of "non-detection" to a state of "detection". As one example, the level of the detection signal is switched from H level into L (logical low) level.

When receiving the signal indicating the state "detection" from the multiple optical axis photoelectric sensor, the power source supply circuit of the machine stops the power supply to the machine in order to transfer the machine to a state in which safety is assured. In this case, the signal indicating the state "detection" can be utilized as a stopping signal. The machine may be arranged to stop the operation only at a dangerous section of the machine or to reduce the speed of the operation at the dangerous section in order to assure safety, instead of powering down the power source of the whole machine, when receiving the signal indicating the state "detection".

The light projecting device 1 and the light receiving device 2 can be provided at upper portions thereof with indicator lamps 10, 20 for announcing the muting. The indicator lamps 10, 20 are turned on during the muting. In case of trouble, the indicator lamps 10, 20 announce the trouble by flashing. The trouble regarding the muting (for example, trouble indicated by an output of the muting sensor) may arise prior to initiating the muting as well as during the muting. Here, "trouble" may be for example a trouble caused by an object (for example, human body) other than a registered workpiece W, a defect in the settings of the sensors, or a trouble (muting error) caused by a variation in the speed or posture of the workpieces W.

In the embodiment of the present invention, the multiple optical axis photoelectric sensor SNS is set to the muting state while workpieces W pass through the detection area LC. With this configuration, the signal indicating the state of "detection" is not output from the multiple optical axis photoelectric sensor SNS.

Figure 2:
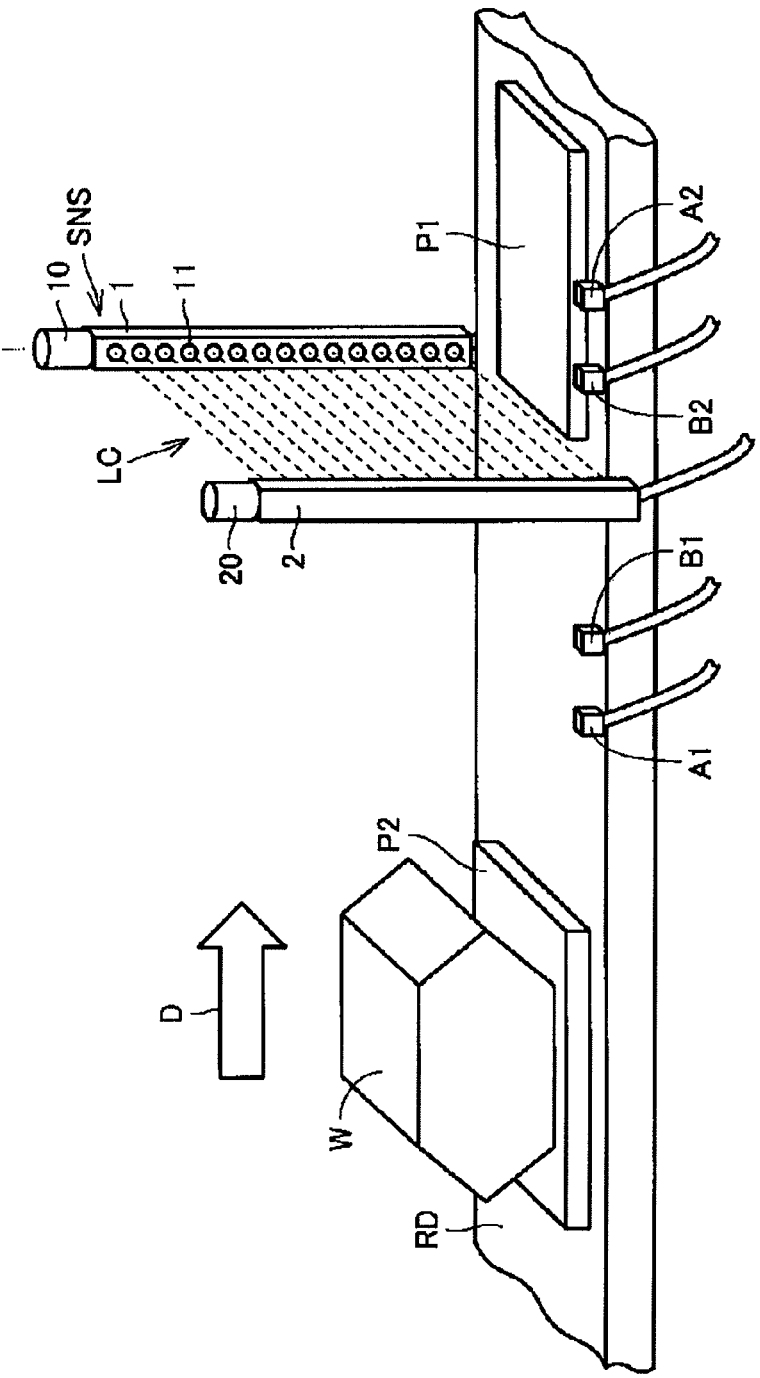
FIG. 2 is a view showing an example in which heights of workpieces vary in the configuration shown in FIG. 1.

In the example shown in FIG. 1, the direction in which a plurality of optical axes are arrayed is a height direction of the workpieces W. With the diversification in the product facility in recent years, there are cases where workpieces having various shapes are conveyed together on the transport path RD. There are also cases where pallets carrying workpieces and pallets not carrying workpieces are conveyed together. FIG. 2 shows an example in which the range of the blocked optical axes are altered in the configuration shown in FIG. 1.

In FIG. 2, no workpieces are carried on the pallet P1. Meanwhile, a workpiece is carried on the pallet P2. The range of the blocked optical axes is altered depending on the settings in order to adapt the muting area to the workpieces, namely for the case that workpieces carried on the pallets are different in height or shape as well as the case that the pallet P1 passes through the detection area and the case that the pallet P2 (and the workpiece W) passes through the detection area LC.

In sensor systems including conventional multiple optical axis photoelectric sensors, the muting area for the passage of pallets not carrying workpieces in the detection area LC, and the muting area for the passage of pallets carrying workpieces in the detection area LC are set up in advance in the multiple optical axis photoelectric sensor. Namely, the multiple optical axis photoelectric sensor stores two different muting areas. The multiple optical axis photoelectric sensor switches the two muting areas according to the signal which is input to the multiple optical axis photoelectric sensor by a user's control, for example.

Meanwhile, according to this embodiment, the multiple optical axis photoelectric sensor SNS examines the range of optical axes whose light is blocked by workpieces or pallets over a certain period of time. The range of optical axes whose light is blocked is referred to as "light blocking area". The multiple optical axis photoelectric sensor SNS sets up the muting area on the basis of the light blocking area. More specifically, the multiple optical axis photoelectric sensor SNS (a muting processing circuit described below) alters the muting area (the range of optical axes to be muted) from a first area (first range) into a second area (second range).

Figure 3:
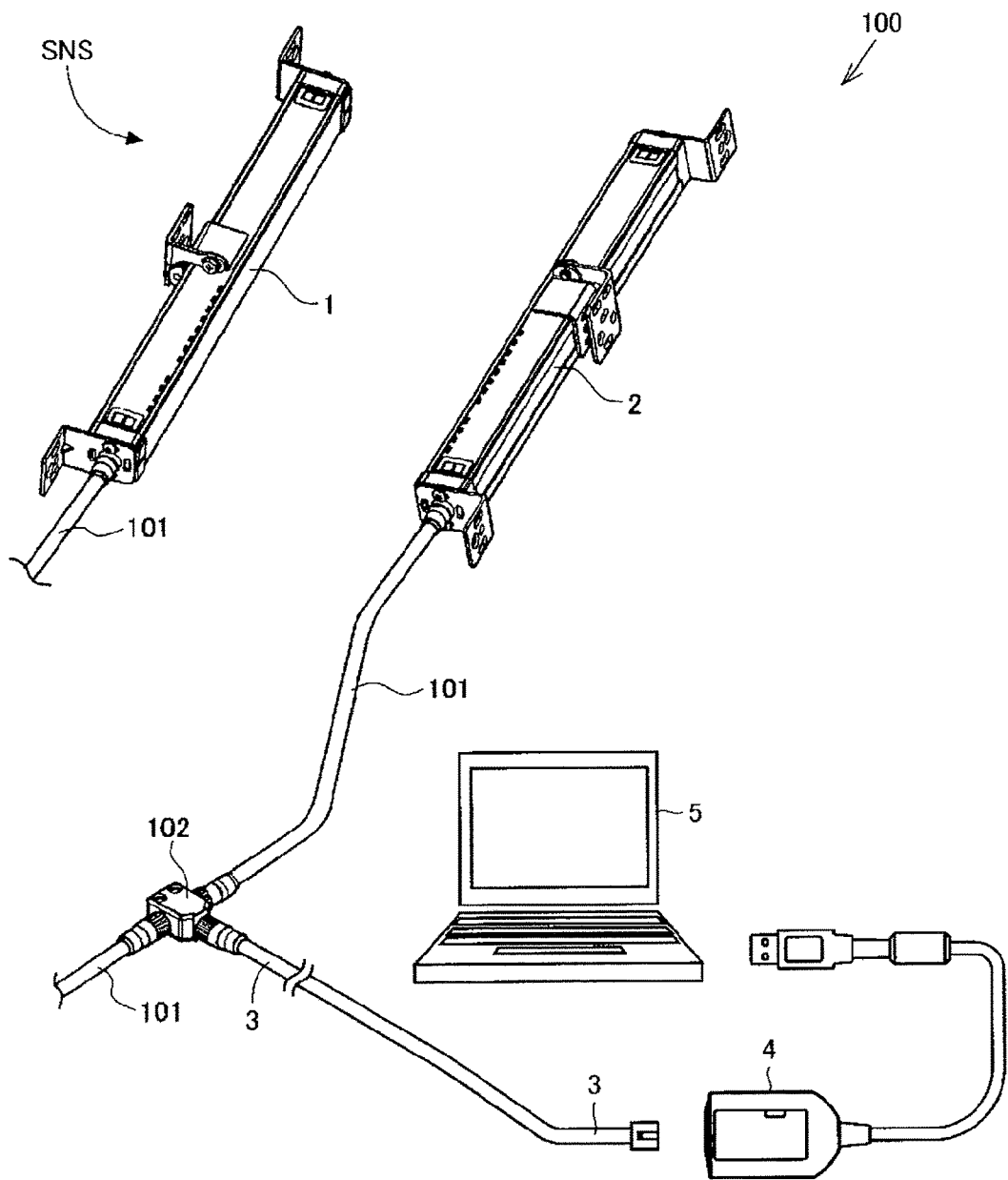
FIG. 3 is an external view showing a configuration example of a sensor system according to the embodiment of the present invention.
Figure 4:
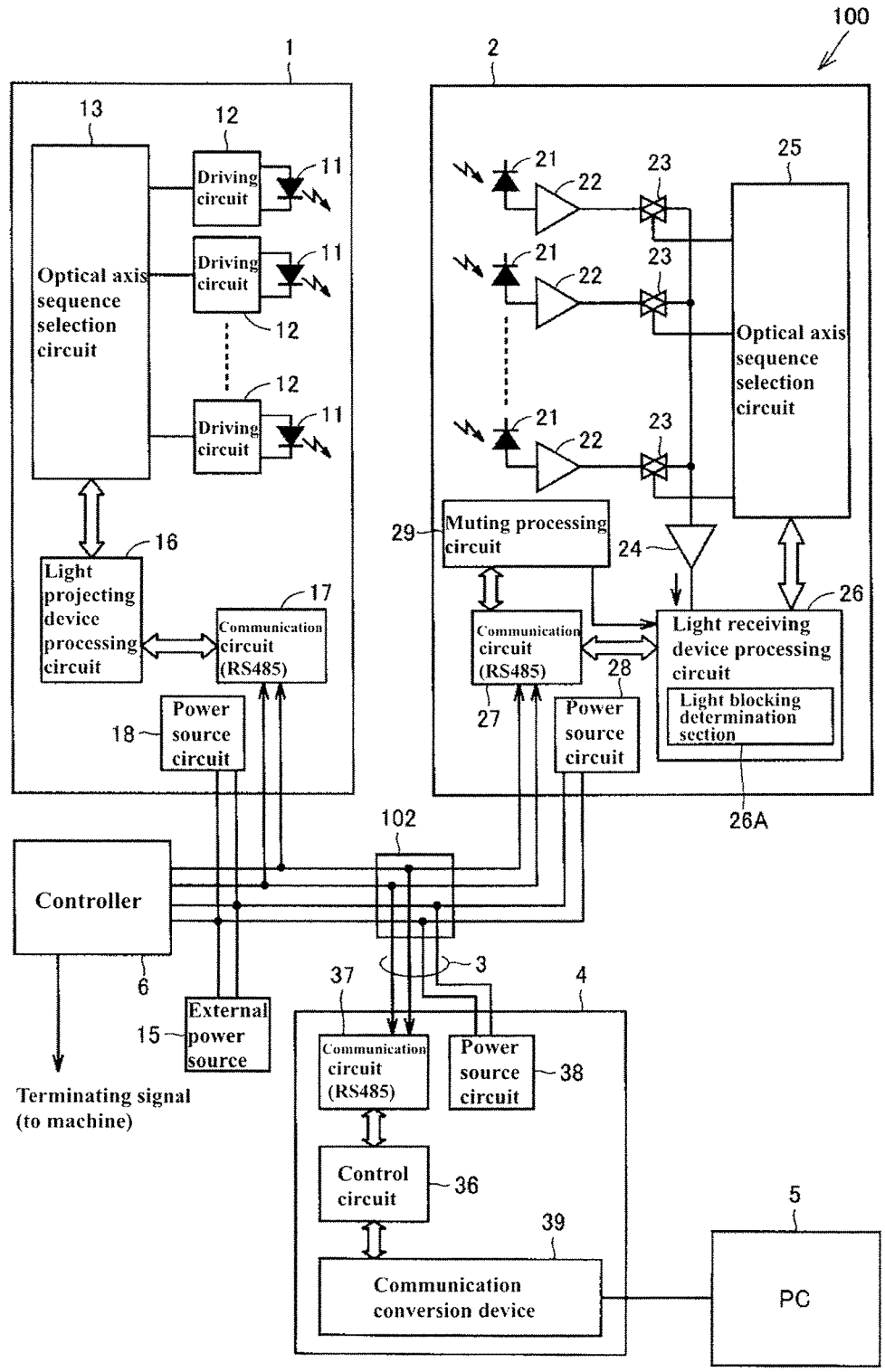
FIG. 4 is a block diagram showing a configuration of a multiple optical axis photoelectric sensor SNS shown in FIG. 3.

FIG. 3 is an external view showing a configuration example of a sensor system according to the embodiment of the present invention. As shown in FIG. 3, the multiple optical axis photoelectric sensor SNS includes the light projecting device 1, the light receiving device 2 and a communication unit 4. The multiple optical axis photoelectric sensor SNS further includes a controller 6 (FIG. 4). The sensor system 100 is provided with the multiple optical axis photoelectric sensor SNS and a personal computer 5. The sensor system 100 may further include the indicator lamps 10, 20 shown in FIG. 1, for example.

The multiple optical axis photoelectric sensor SNS includes the light projecting device 1, the light receiving device 2 and a communication cable 101. The light projecting device 1 and the light receiving device 2 are connected to each other by way of the communication cable 101. The communication unit 4 is connected to the communication cable 101 by way of a branch connector 102 and a dedicated cord 3. The communication unit 4 is connected to the branch connector 102 and the personal computer 5.

FIG. 4 shows a block diagram showing a configuration of the multiple optical axis photoelectric sensor SNS shown in FIG. 3. As shown in FIG. 4, the light projecting device 1 is provided with the plurality of light emitting elements 11. The light projecting device 1 is further provided with driving circuits 12 driving individually the light emitting elements 11, an optical axis sequence selection circuit 13, a light projecting device processing circuit 16, a communication circuit 17 and a power source circuit 18.

The light receiving device 2 is provided with the plurality of light receiving elements 21 disposed respectively in correspondence with the plurality of light emitting elements 11. The light receiving device 2 is further provided with amplifiers 22 and switches 23 which are disposed in correspondence with the plurality of light receiving elements 21, an optical axis sequence selection circuit 25, a light receiving device processing circuit 26, an amplifier 24 for an input to the light receiving device processing circuit 26, a communication circuit 27, a power source circuit 28 and a muting processing circuit 29. The light receiving device processing circuit 26 includes a light blocking determination section 26A.

The light projecting device processing circuit 16 and the light receiving device processing circuit 26 are constituted by microcomputers provided with a CPU, a memory and so on. The light projecting device processing circuit 16 and the light receiving device processing circuit 26 workpiece cooperate in such a way as to synchronize the optical axis sequence selection circuits 13, 25 with each other for operation. The blocked light determination section 26A determines for each optical axis whether it is in the light incidence state or light blocking state by comparing amounts of received light sequentially obtained for the respective optical axes with a predetermined threshold. Moreover, the light blocking determination section 26A determines the presence or absence of blocked light in the overall detection area LC (in an area not subject to muting, during the muting) by aggregating the determination results for the individual optical axes in each cycle of optical axis selection. The communication circuits 17, 27 are communication interfaces compatible to RS485, and control transmissions of signals between the light projecting device 1 and the light receiving device 2, signals between the controller 6 and the light projecting device 1, and signals between the controller 6 and the light receiving device 2. The aggregated detection result is output to the controller 6 by way of the communication circuit 27.

The optical axis sequence selection circuits 13 activates sequentially the driving circuits 12 of the light emitting elements 11. Namely, the optical axis sequence selection circuit 13 achieves a state in which electric current is supplied to the light emitting elements 11. The optical axis sequence selection circuit 25 sequentially turns on the switches 23 corresponding to respective light receiving elements 21, in order to supply the light receiving signals output from the amplifiers 22 to the light receiving device processing circuit 26.

The power source circuits 18, 28 receive electric power supply from the common external power source 15 (direct current power source), supplying electric power to the light projecting device 1 and the light receiving device 2.

The controller 6 inputs the aggregated results of the light blocking determination, and outputs a signal (terminating signal) indicating a state of "detection" when the determination result is that light is blocked. When it is determined, as a determination result, that there is no light blocking, a signal indicating a state of "non-detection" is output. The controller 6 acts as an output section of the multiple optical axis photoelectric sensor SNS. As shown in FIG. 4, the controller 6 may be provided separate from the light projecting device 1 and the light receiving device 2 separately, or installed within either one of the light projecting device 1 and the light receiving device 2. In addition, the light blocking determination section 26A and the muting processing circuit 29 may be installed within the controller 6.

The branch connector 102 branches the communication line and the power source line between the light projecting device 1 and the light receiving device 2. The branched communication line and the branched power source line are accommodated in the dedicated cord 3. The communication unit 4 is connected to the dedicated cord 3. The communication unit 4 is connected to the personal computer (which is represented by "PC" in FIG. 4) 5.

The communication unit 4 includes a control circuit 36, a communication circuit 37, a power source circuit 38 and a communication conversion device 39. The communication circuit 37 is an interface compatible to the RS485 standard. The power source circuit 38 receives electric power from the external power source 15 by way of the branch connector 102, and supplies the electric power to each section in the communication unit 4. The communication conversion device 39 performs a serial conversion for an RS485 standard signal, and outputs a signal compatible to a standard such as RS232C or USB (Universal Serial Bus).

The optical axis sequence selection circuit 13 and the optical axis sequence selection circuit 25 are synchronized with each other, and the plurality of light emitting elements 11 are turned on in sequence, while the light receiving signals of the plurality of the light receiving elements 21 are supplied to the light receiving device processing circuit 26 in sequence. The light projecting device processing circuit 16 and the light receiving device processing circuit 26 transmit and receive signals for synchronizing operations of the optical axis sequence selection circuits 13, 25 by way of the communication circuits 17, 27.

The light projecting device 1 and the light receiving device 2 are synchronized with each other by utilizing communication via the communication cable 101. However, the light projecting device 1 and the light receiving device 2 can also be synchronized with each other by utilizing optical communication by means of space optical transmission.

The detection signals from the muting sensors A1, B1, A2, B2 (FIG. 1) are input to the controller 6, and fed to the muting processing circuit 29 by way of the communication cable 101.

Figure 5:
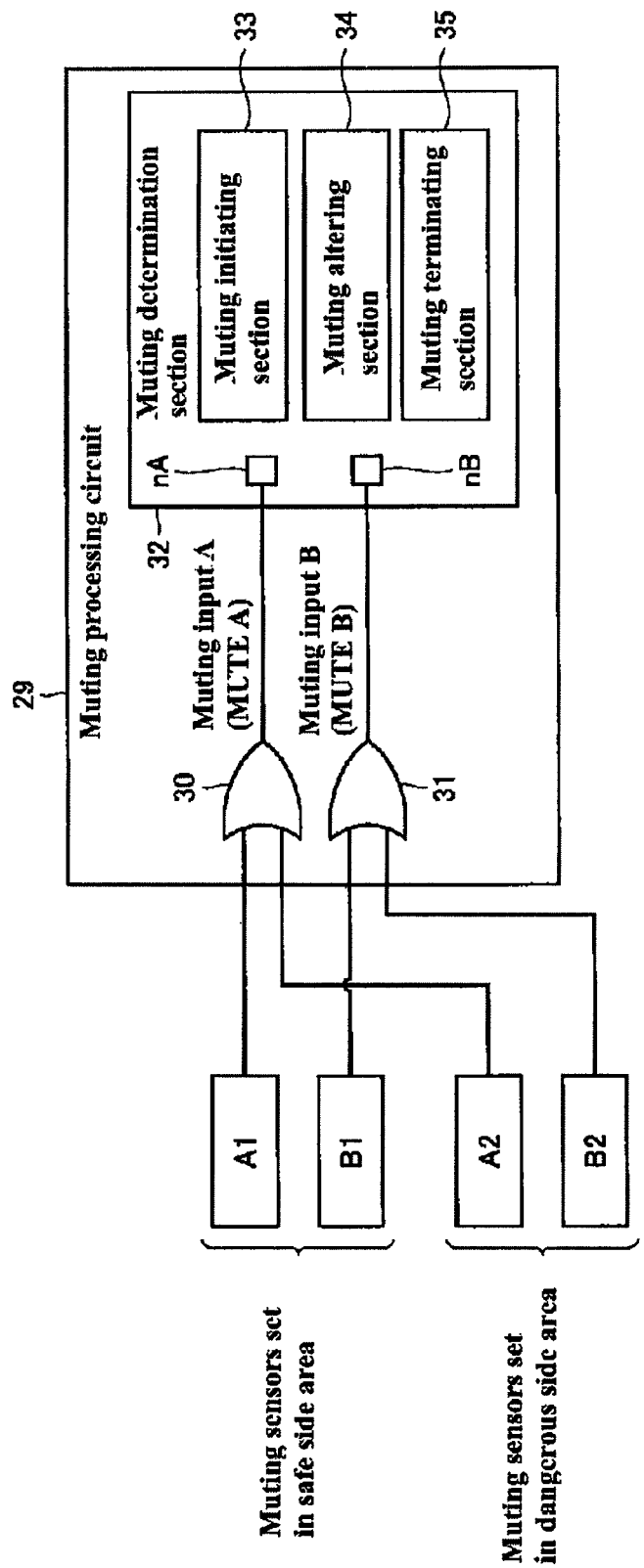
FIG. 5 is a block diagram showing a configuration of a muting processing circuit 29.

FIG. 5 is a block diagram showing the configuration of the muting processing circuit 29. As shown in FIG. 5, the muting processing circuit 29 includes OR circuits 30, 31 and a muting determination section 32. The muting determination section 32 includes input ports nA, nB, a muting initiating section 33, a muting altering section 34 and a muting terminating section 35.

The OR circuit 30 receives output signals from the muting sensors A1, A2. The muting sensors A1, A2 output H level signals when detecting workpieces W, and L level signals when not detecting workpieces W. The OR circuit 30 generates a logical sum of two signals, and outputs a signal to the input port nA. The OR circuit 31 receives output signals from the muting sensors B1, B2. The muting sensors B1, B2 output H level signals when detecting workpieces W, as well as output L level signals when not detecting workpieces W. The OR circuit 31 generates a logical sum of two signals, and outputs a signal to the input port nB.

Hereinafter, a signal which is input to the muting determination section 32 from the muting sensors A1, A2 by way of the OR circuit 30 and the input port nA is referred to as "MUTE A (muting input A)". Meanwhile, a signal which is input to the muting determination section 32 from the muting sensors B1, B2 by way of the OR circuit 31 and the input port nB is referred to as "MUTE B (muting input B)".

The muting determination section 32 controls initiation of muting by the muting initiating section 33, change of the muting area by the muting altering section 34 and termination of the muting by the muting terminating section 35, on the basis of the signals MUTE A and MUTE B from the muting input circuit 19. The muting determination section 32 outputs a signal to control the muting to the receiving device processing circuit 26. The receiving device processing circuit 26 initiates, alters or terminates the muting according to the control signal from the muting determination section 32.

Referring again to FIG. 4, a program for setting up various parameters at the multiple optical axis photoelectric sensor SNS and displaying various states of the multiple optical axis photoelectric sensor SNS is installed in the personal computer 5. In addition to the personal computer 5, or instead of the personal computer 5, another displaying device (for example, a dedicated console) having the same function may be connected to the communication unit 4.

Figure 6:
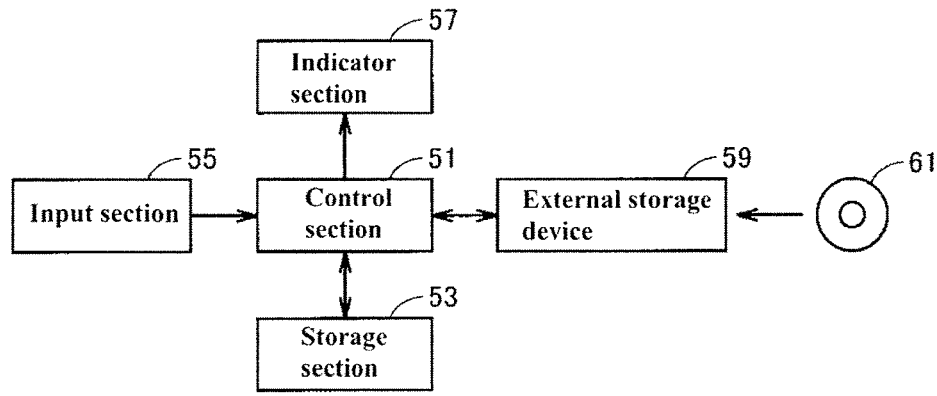
FIG. 6 is a diagram showing a configuration of a personal computer 5 shown in FIG. 4.

FIG. 6 is a diagram showing a configuration of the personal computer 5 shown in FIG. 4. As shown in FIG. 6, the personal computer 5 includes a control section 51 for overall control, an input section 55 for inputting data, a storage section 53 for storing the data temporarily, a displaying section 57 for outputting data, and an external storage device 59 for storing a program and the like to be executed at the control section 51 in a non-volatile way.

The control section 51 includes a CPU, and either of a read-only memory (ROM) for storing a program to be executed in this CPU and a random access memory (RAM) for storing a variable and the like required for program execution in the CPU.

The input section 55 may be a keyboard or a mouse, and capable of inputting characters, numerals or predetermined instruction commands. The input section 55 receives the data transmitted from the communication unit 4.

The storage section 53 temporarily stores various data and the like required for setting up the multiple optical axis photoelectric sensor SNS.

The displaying section 57 is a display such as a liquid crystal display device, and displays various kinds of information (for example, operation results of the multiple optical axis photoelectric sensor SNS) in accordance with instructions from the control section 51.

The external storage device 59 reads out a program or data recorded in a recording medium which is capable of being read out by a computer, and transmits the data to the control section 51, for example.

Figure 7:
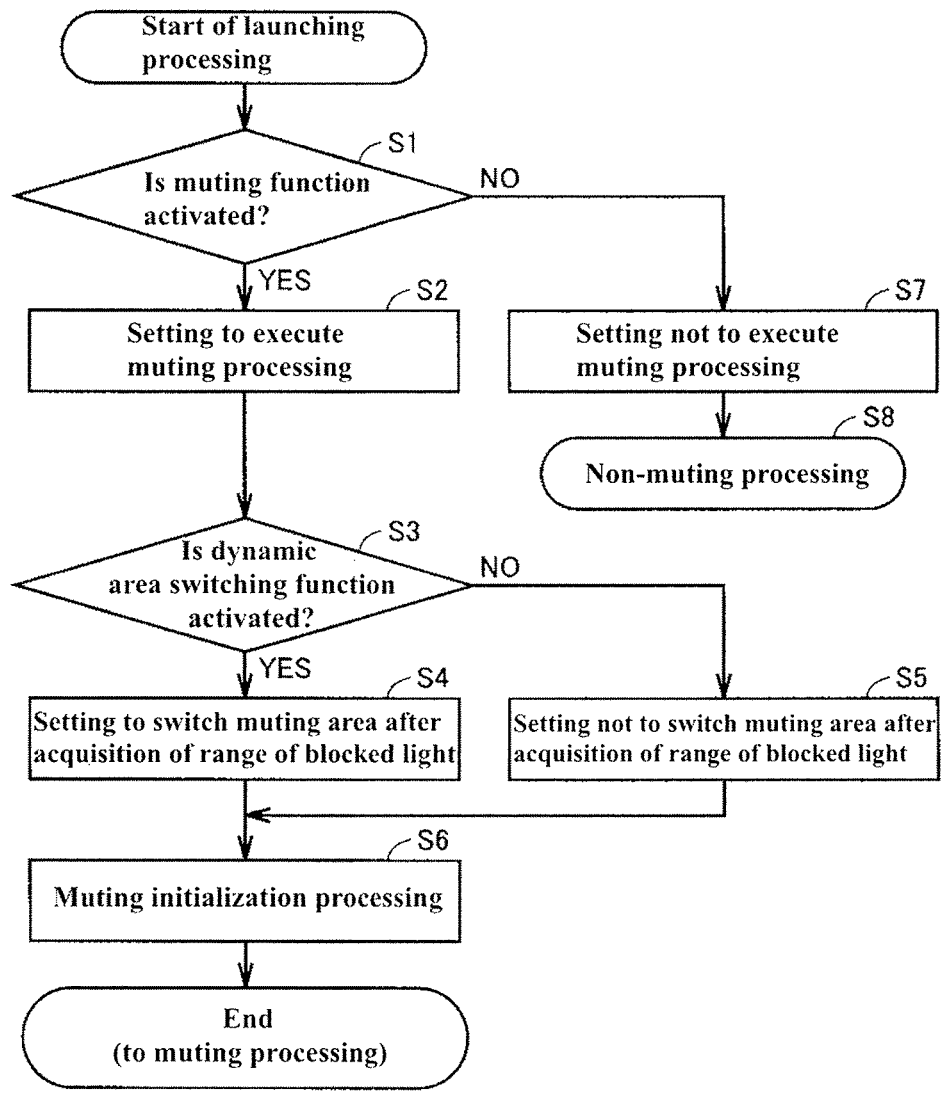
FIG. 7 is a flowchart for explanation of basic flow of launching processing executed by the sensor system 100 according to the embodiment of the present invention.

FIG. 7 is a flowchart for explanation of the basic flow of launching processing executed by the multiple optical axis photoelectric sensor SNS according to the embodiment of the present invention. The processing described in FIG. 7 and other drawings is executed by function blocks relevant to the control of the multiple optical axis photoelectric sensor SNS. Therefore, it is not restricted only to the specific function blocks for execution of processing explained below. Namely, the processing in each step in the flowchart is executable by at least one of the light projecting device processing circuit 16, the light receiving device processing circuit 26 and the controller 6.

As shown in FIG. 7, the launching processing is initiated by power activation of the multiple optical axis photoelectric sensor SNS, for example. First, a determination is made as to whether or not the muting function is activated (step S1). The determination of whether or not each functions is activated can be achieved by various well-known methods, and will not be explained in detail again. For example, the determination of whether or not each function is activated can be made by setting switches or referring to parameters stored inside of the device.

In case the muting function is activated (YES in step S1), the multiple optical axis photoelectric sensor SNS is set to execute the muting processing (step S2). In case the muting function is deactivated (NO in step S1), the multiple optical axis photoelectric sensor SNS is set not to execute the muting processing (step S7). After processing of step S7, non-muting processing is executed (step S8).

In case the multiple optical axis photoelectric sensor SNS is set to execute the muting processing, a determination is made as to whether or not a dynamic area switching function is activated (step S3). The "dynamic area switching function" is a function capable of dynamically switching the muting area on the basis of the range of blocked light in a certain period during the passage of workpieces. This function will be explained below in detail.

In case the dynamic area switching function is activated (YES in step S3), the multiple optical axis photoelectric sensor SNS is set to dynamically switch the muting area after the range of blocked light is obtained (step S4). In case the dynamic area switching function is deactivated (NO in step S3), the multiple optical axis photoelectric sensor SNS is set not to switch the muting area (step S5). In step S5, it is not necessarily required to obtain the range of blocked light.

Subsequent to the processing in step S4 or S5, muting initializing processing is executed (S6). For example, various checks for initializing the muting are executed. After the muting initializing processing terminates, the launching processing terminates. Afterward, the muting processing is executed according to the input from the muting sensor.

Figure 8:
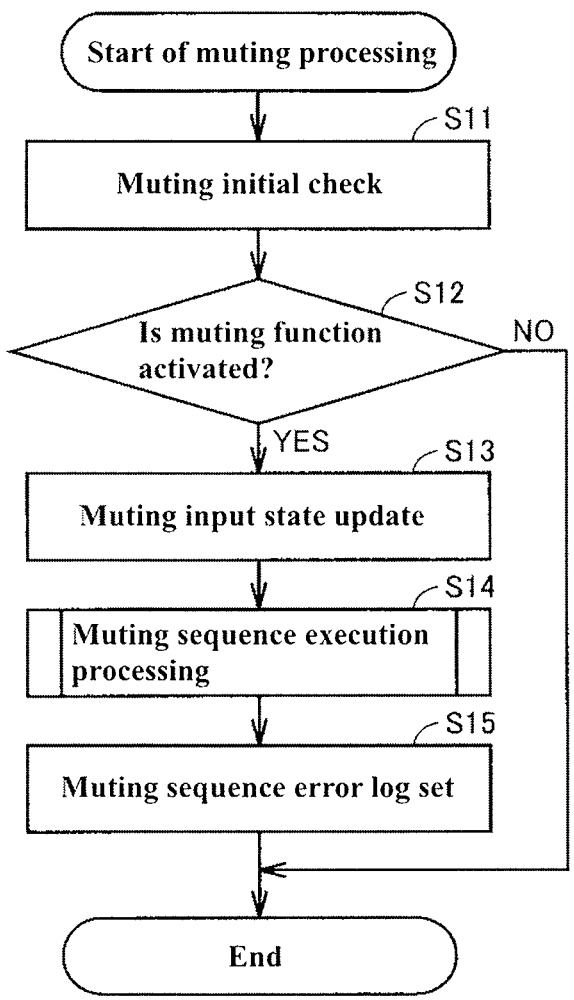
FIG. 8 is a flowchart for explanation of basic flow of muting processing executed by the sensor system 100 according to the embodiment of the present invention.

FIG. 8 is a flowchart for explanation of basis flow of the muting processing executed by the sensor system 100 according to the embodiment of the present invention. As shown in FIG. 8, a muting initial check is executed (step S11).

Next, a determination is made as to whether or not the muting function is activated (step S12). In case the muting function is deactivated (NO in step S12), the muting processing terminates. In case the muting function is activated (YES in step S12), the muting input state is updated (step S13). For example, the states of the muting sensors A1, A2, B1, B2 are confirmed.

Next, muting sequence execution processing is executed (step S14). The muting sequence execution processing will be explained below.

Next, a muting sequence error log is set (step S15). Specifically, in case of causing an error of the muting sequence, displaying with the indicator lamp and/or recording the error content is executed in accordance with the error.

Figure 9:
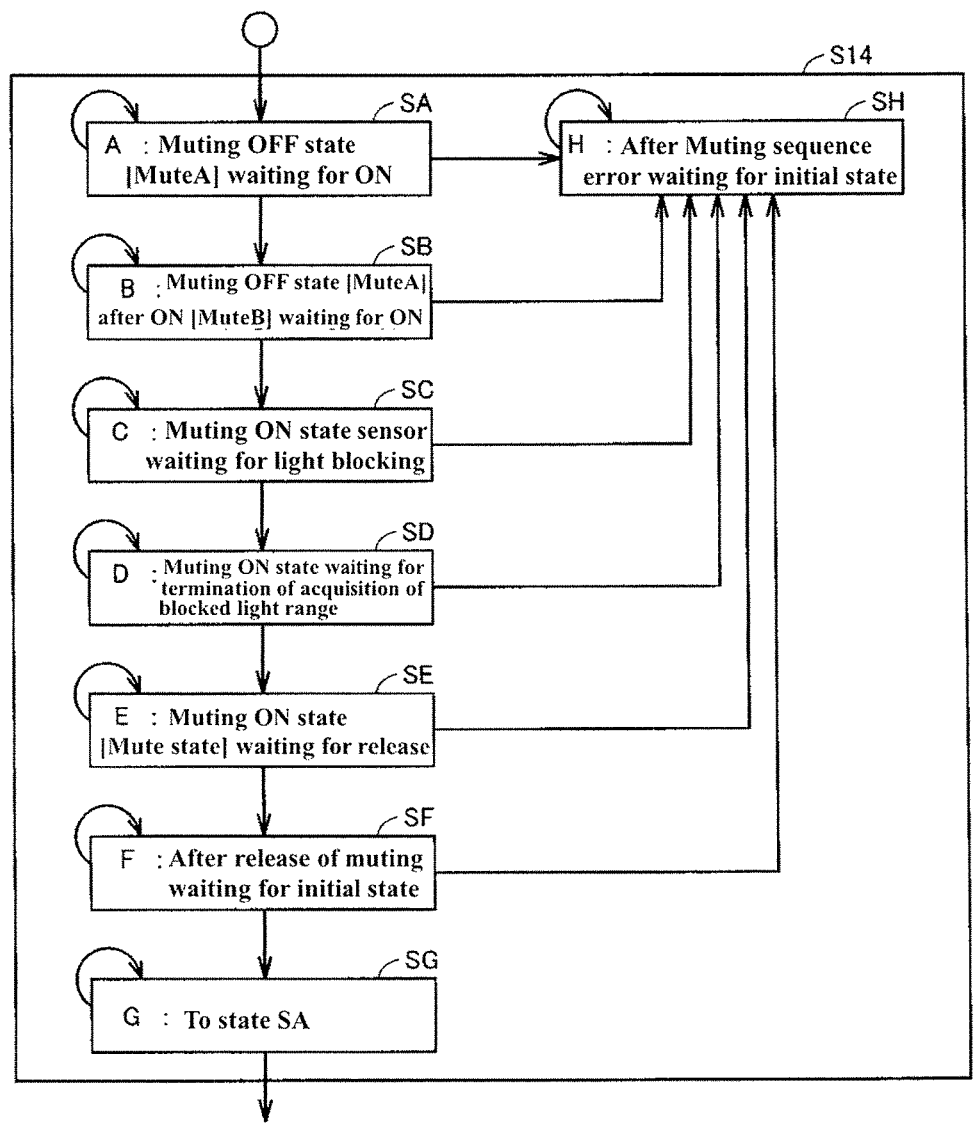
FIG. 9 is a state transition diagram for explanation of muting sequence execution processing (S14) described in FIG. 8.

FIG. 9 is a state transition diagram for explanation of the muting sequence execution processing (S14) described in FIG. 8. As shown in FIG. 9, the initial state is a state waiting for an on (ON) state of MUTE A (state SA).

When the workpiece W is detected with the muting sensor A1, MUTE A is turned on, causing a transition from the state SA to a state SB. The state SB is a state waiting for an on (ON) state of MUTE B.

Next, when the workpiece W is detected with the muting sensor B1, MUTE B is turned on. This results in the muting execution state (muting ON state), causing a transition from the state SB to a state SC. The state SC is a state waiting for the light blocking in the multiple optical axis photoelectric sensor SNS after MUTE B is turned on. A series of processes in the states SA to SC is executed by the muting initiating section 33.

When the light blocking is detected by the multiple optical axis photoelectric sensor SNS, the state SC transitions to a state SD. The state SD is a state waiting for termination of the blocked light range acquisition processing.

When the blocked light range acquisition processing is terminated, the state SD transitions to a state SE. This results in a state waiting for release from the muting state. In the state SE, in case the dynamic area switching function is activated, the muting area is altered on the basis of the range of blocked light. When the muting state is released in the state SE, the state SE transitions to a state SF. This results in a state waiting for the initial state. Specifically, the system waits for a state in which MUTE A is switched off so as to be back to the state waiting for switch-on thereof. When the initial state is established, it transitions to the state SA.

In case of causing sequence error in any of the states SA to SF, the current state transitions to a state SH. The state SH is a state waiting for the initial state after the sequence error occurs. Afterwards, when the initial state is established, the state SH transitions to the state SA.

Figure 10:
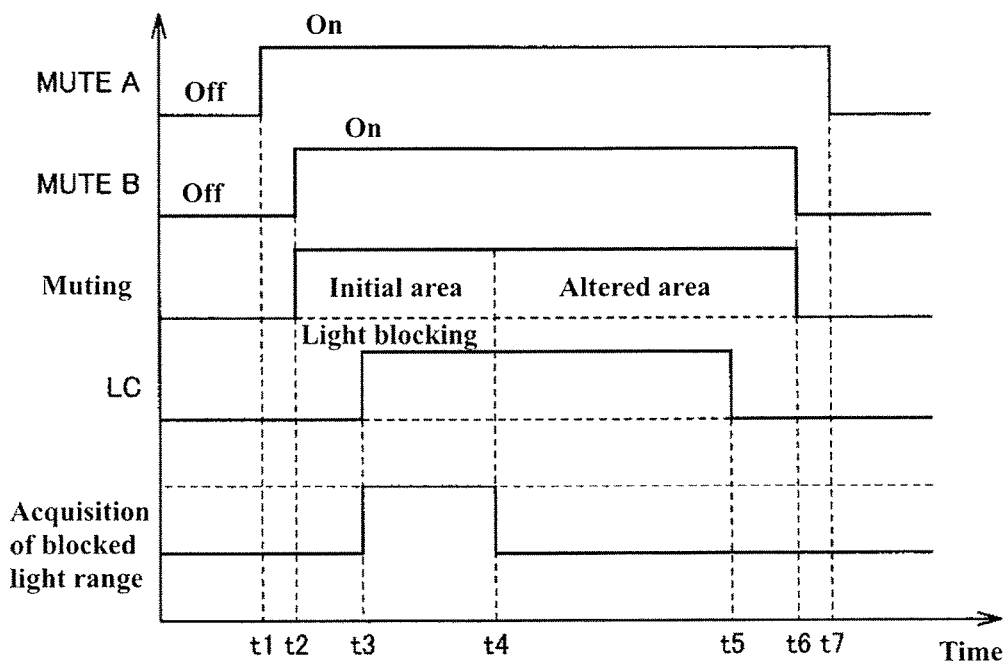
FIG. 10 is a signal waveform diagram for explanation of an example of a dynamic area switching processing according to the embodiment of the present invention.

FIG. 10 shows a signal waveform diagram for explanation of one example of the dynamic area switching processing according to the embodiment of the present invention. As shown in FIG. 10, before the time t1, the workpiece W does not reach the position of the muting sensor A1. Therefore, the workpiece W is not detected by any of the muting sensors A1, A2, B1, B2. All of the muting sensors A1, A2, B1, B2 output L (logical low) level signals. Therefore, both levels of MUTE A and MUTE B are L level. Namely, MUTE A and MUTE B are in off states (state SC shown in FIG. 9).

At the time t1, the muting sensor A1 detects the workpiece W. Therefore, the level of signal output from the muting sensor A1 is altered into H (logical high) level from L level. Therefore, the level of MUTE A is altered into H level from L level. Namely, MUTE A becomes on at the time t1.

At the time t2, the muting sensor B1 detects the workpiece W. Therefore, the level of the signal output from the muting sensor B1 is altered into H level from L level. Therefore, the level of MUTE B is altered into H level from L level. Namely, MUTE B becomes on at the time t2. This sequence of signal changes indicates that a workpiece W is conveyed toward the multiple optical axis photoelectric sensor SNS.

At the time t2, both MUTE A and MUTE B are on. In this condition, the muting processing is initiated (state SD shown in FIG. 9). The muting area is set to the initial area.

At the time t3, the workpiece W blocks optical axes in the detection area LC. The blocked light determination section 26A of the multiple optical axis photoelectric sensor SNS detects at least one optical axis blocked in the detection area LC. At the time t3, the acquisition of the range of blocked light is initiated. Specifically, the muting altering section 34 shown in FIG. 5 identifies which of the optical axes is blocked, and then specifies the area of blocked light corresponding to the blocked optical axes.

At the time t4, the acquisition of the range of blocked light is terminated. Therefore, the period between the time t3 and the time t4 is the period for acquiring the range of blocked light.

In one embodiment, the length of the acquisition period for acquiring the range of blocked light is an invariable length (for example, 1 second). In another embodiment, the length of the acquisition period for acquiring the range of blocked light may be variable. For example, the acquisition period for acquiring the range of blocked light of the multiple optical axis photoelectric sensor may be configured to be set by the user. Alternatively, the muting altering section 34 may determine the acquisition period for acquiring the range of blocked light depending on the period until MUTE B becomes on after MUTE A becomes on, in other words, depending on the speed of the conveyed workpieces W. For example, the acquisition period for acquiring the range of blocked light may be set shorter as the conveying speed of the workpieces W increases. Alternatively, a measurement means may be provided in order to measure the lengths of the conveyed workpieces W and the time required for their passage, and the acquisition period for acquiring the range of blocked light may be set longer as the length of the workpiece W and the time required for passage increase.

In this embodiment, the acquisition of the range of blocked light is initiated at the time (time t3) when the optical axis in the detection area LC is blocked by the workpiece W, or a light blocking object. However, the initiation time for acquiring the range of blocked light is not limited to this time. In one embodiment, it is possible to initiate the acquisition of the range of blocked light a certain period of time after the time when optical axes in the detection area are blocked. In another embodiment, it is possible to initiate the acquisition of the range of blocked light when the muting area is an initial area described below.

At the time t4, the muting altering section 34 alters the muting area from the initial area (first range), which is the range of all optical axes, into the area (second area) corresponding to the range of blocked light. After this change, the multiple optical axis photoelectric sensor SNS does not output a signal indicating the state "detection" even when any of the optical axes corresponding to the altered muting area is blocked.

After the workpiece W has passed through the position of the muting sensor A1, the detection of the workpiece W by the muting sensor A is terminated. The detection is terminated in the same way for the muting sensor B1. On the other hand, the muting sensor B2 detects the workpiece W at a certain timing at the time t3 or after, with the displacement as the workpiece moves forward. Afterwards, the muting sensor A2 detects the workpiece W. Therefore, MUTE A and MUTE B are maintained at on. But, when the length of the workpiece W is shorter than the distance between the muting sensor A1 and the muting sensor A2, there is a temporary period when MUTE A is off. Similarly, when the length of the workpiece W is shorter than the distance between the muting sensor 111 and the muting sensor B2, there is a temporary period when MUTE B is off. The muting sensors are preferably disposed such that the off period is within the period in which the multiple optical axis photoelectric sensor SNS is in the light blocking state caused by the passage of workpiece W, even if MUTE B is turned off temporarily. With this arrangement, it is possible to continuously confirm the presence of the workpiece W with any of the muting sensors or the multiple optical axis photoelectric sensor SNS anytime until the detection of the workpiece W with the muting sensor A2 is terminated after the detection of the workpiece W with the muting sensor A1 is initiated.

At the time t5, the workpiece W has passed completely through the detection area LC. At the time t6, the workpiece W passes at the position of the muting sensor B2, and thereby the detection of the workpiece W with the muting sensor B2 is terminated. Both output signals of the muting sensors B1, B2 are at L level, and thus MUTE B is in L level. The muting terminating section 35 terminates the muting processing when MUTE B is in L level.

At the time t7, the workpiece W has passed the position of the muting sensor A2, thereby terminating the detection of the workpiece W with the muting sensor A2. Both output signals of the muting sensors A1, A2 become L level. Therefore, at the time t7, MUTE A becomes L level.

Figure 11:
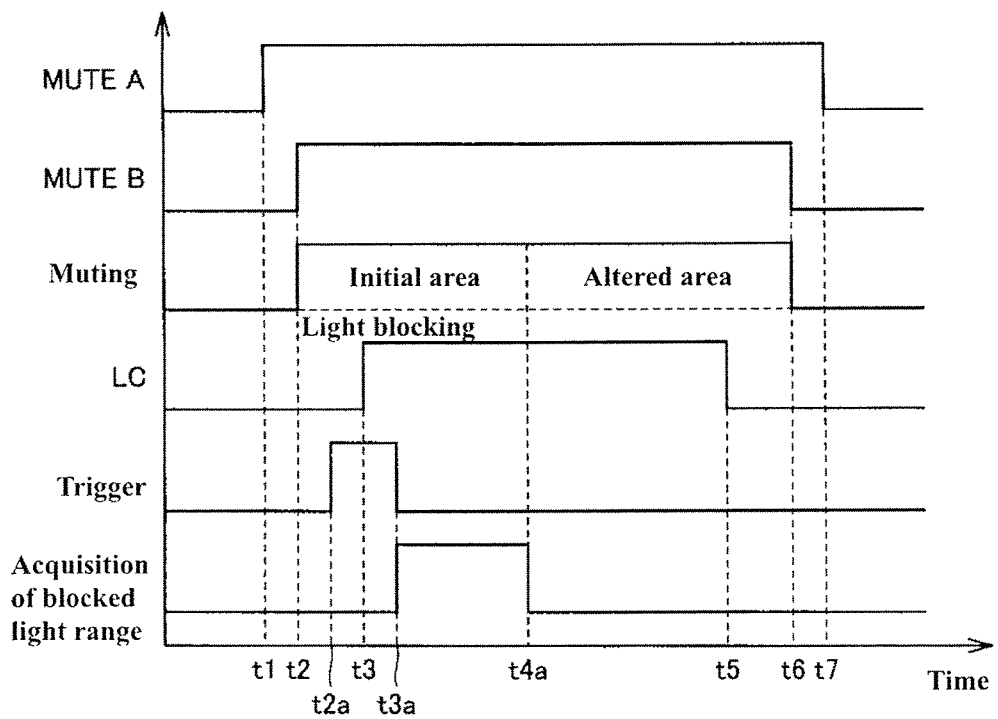
FIG. 11 is a signal waveform diagram for explanation of another example of the dynamic area switching processing according to the embodiment of the present invention.

FIG. 11 shows a signal waveform diagram for explanation of another example of the dynamic area switching processing according to an embodiment of the present invention. As shown in FIG. 11, in response to a trigger signal input from outside, the muting altering section 34 shown in FIG. 5 initiates the acquisition of the range of blocked light. For example, it is possible to employ the detection signal of the muting sensor B2 indicating the detection of the workpiece W as the trigger signal. In addition, it is possible to generate the trigger signal a certain period of time after the workpiece W is detected with the muting sensor B1, or after a lapse of a variable time depending on the conveying speed. It is also possible to provide a workpiece detection sensor for the generation of the trigger signal. The device and method for generating the trigger signal are not particularly limited.

In FIG. 11, in the period between the time t2a and the time t3a, the trigger signal is given to the multiple optical axis photoelectric sensor SNS. At the time t3a, the acquisition of the range of blocked light is initiated. Alternatively, the acquisition of the range of blocked light may be initiated in synchronization with the generation of the trigger signal (the acquisition period for acquiring the range of blocked light may be initiated from the time t2a). Alternatively, the acquisition of the range of blocked light may be initiated at an arbitrary timing afterwards. For example, the acquisition period for acquiring the range of blocked light may be initiated after a time delayed from the time t3a.

The acquisition period for acquiring the range of blocked light is a period between the time t3a and the time t4a. The length of the period of acquiring the range of blocked light may be a fixed time (e.g., one second), a set time, or a time that is determined on the basis of information indicating the speed, length of the detected object or time required for passage thereof, as in the case in FIG. 10.

Figure 12:
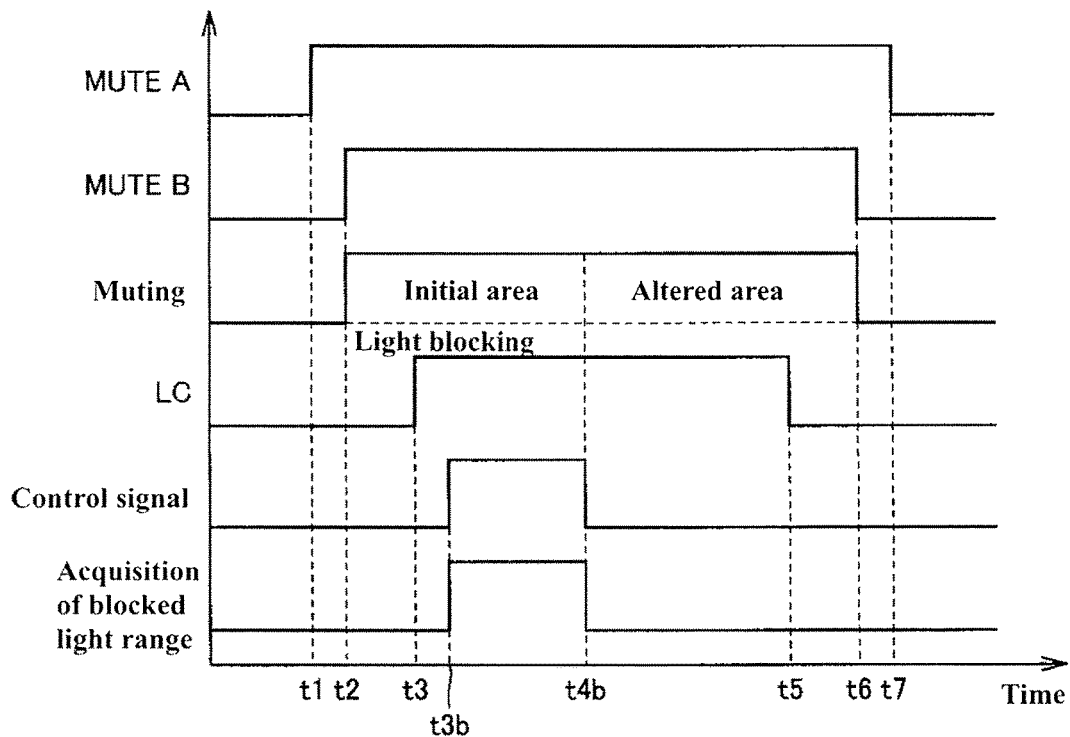
FIG. 12 is a signal waveform diagram for explanation of another example of the dynamic area switching processing according to the embodiment of the present invention.

FIG. 12 shows a signal waveform diagram for explanation of another example of the dynamic area switching processing according to an embodiment of the present invention. As shown in FIG. 12, the range of blocked light is acquired while a control signal input from outside via the controller 6 is on. In this embodiment, the period of acquiring the range of blocked light is controlled directly by the control signal.

The control signal is generated between the time t3b and the time t4b. Therefore, the period of acquiring the range of blocked light is a period between the time t3b and the time t4b. But, the acquisition period for acquiring the range of blocked light can be initiated with a delay after the initiation (at the time t3b) of the control signal. Similarly, the acquisition period for acquiring the range of blocked light can be terminated with a delay after the termination (at the time t4b) of the control signal.

Of the processes shown in FIG. 11 and FIG. 12, processes other than above are the same as those shown in FIG. 10, and therefore subsequent explanation will not be made again.

Figure 13:
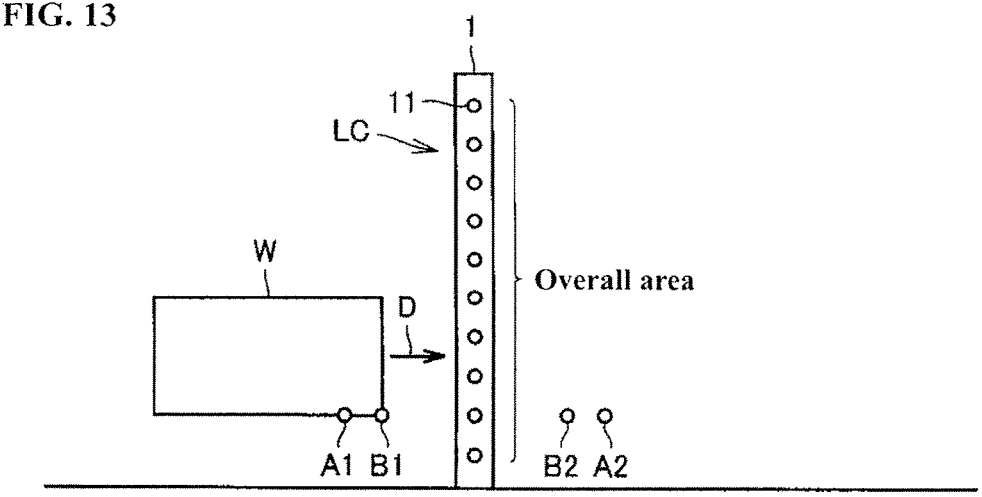
FIG. 13 is a view for explanation of an example of an initial area.
Figure 14:
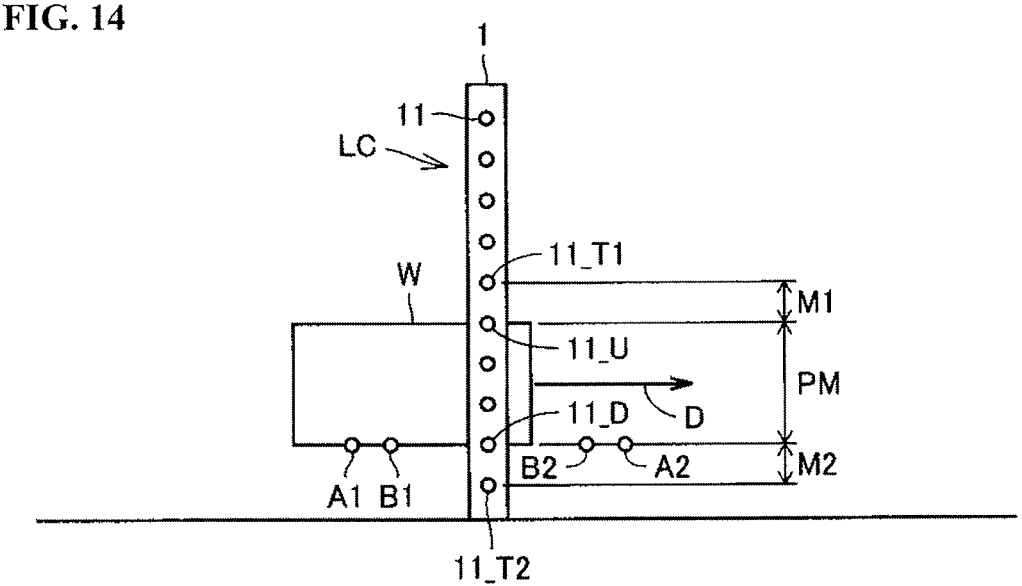
FIG. 14 is a view for explanation of a changed muting area.

FIG. 13 is a figure for explanation of one example of the initial area. FIG. 14 is a figure for explanation of the altered muting area. As shown in FIG. 13 and FIG. 14, the initial muting area, that is, the "initial area" (first range) is set to the entire detection area LC (the range over all optical axes) before the workpiece W passes through the detection area LC. While the workpiece W passes through the detection area LC, the area of light blocked by the workpiece W is acquired. Optical axes 11_U, 11_D corresponding to both edges of the area are determined by the multiple optical axis photoelectric sensor SNS. The area between the optical axes 11_U, 11_D is set as the altered muting area PM (second range).

In this embodiment, the optical axis 11_U corresponds to the top edge of the muting area PM, while the optical axis 11_D corresponds to the bottom edge of the muting area PM. In response to the intrusion of the workpiece W into the detection area LC, two optical axes corresponding to the both edges for the determination of the altered muting area are identified.

One or both of an allowance range M1 and an allowance range M2 may be added outside of the muting area PM as a muting range continuous to the muting area PM, as required. The allowance range M1 is an additional range above the muting area PM. The allowance range M2 is an additional range below the muting area PM.

For example, the workpiece W may vibrate while being conveyed. With the addition of one or both of the allowance range M1 and the allowance range M2 in the muting area PM, it is possible to set up a muting area for allowing the vibration of the workpiece W.

The additional range is preferably a range corresponding to one optical axis. In most cases, an additional range corresponding to one optical axis will suffice in coping with the vibration of the conveyed workpiece W.

In FIG. 14, the allowance range M1 is defined by the optical axis 11_U and an adjacent (the one above) optical axis 11_T1. Similarly, the allowance range M2 is defined by the optical axis 11_D and an adjacent (the one below) optical axis 11_T2. The dimensions of the allowance ranges M1, M2 are not particularly limited. In addition, the dimensions of the allowance ranges M1, M2 are not necessarily limited to invariable ones, but may be variable. For example, at least one of the allowance range M1 and the allowance range M2 may be altered according to the extent of the vibration of the workpiece W.

Figure 15:
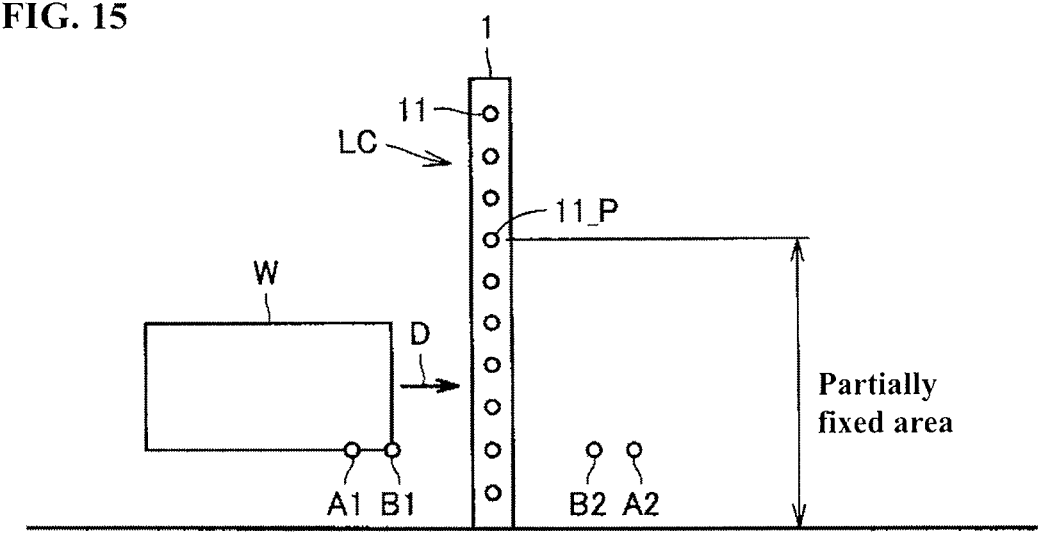
FIG. 15 is a view for explanation of another example of the initial area.

FIG. 15 shows a figure illustrating another example of the initial area. As shown in FIG. 15, the initial muting area is a part of an area (partially fixed range) which is fixed in advance. For example, an area having the optical axis 11_P of the detection area LC as a top edge may be set as the initial area. For example, when numerals are assigned to the optical axes, the initial area can be set as the optical axes of a given numeral or more, or of a given numeral or less.

Figure 16:
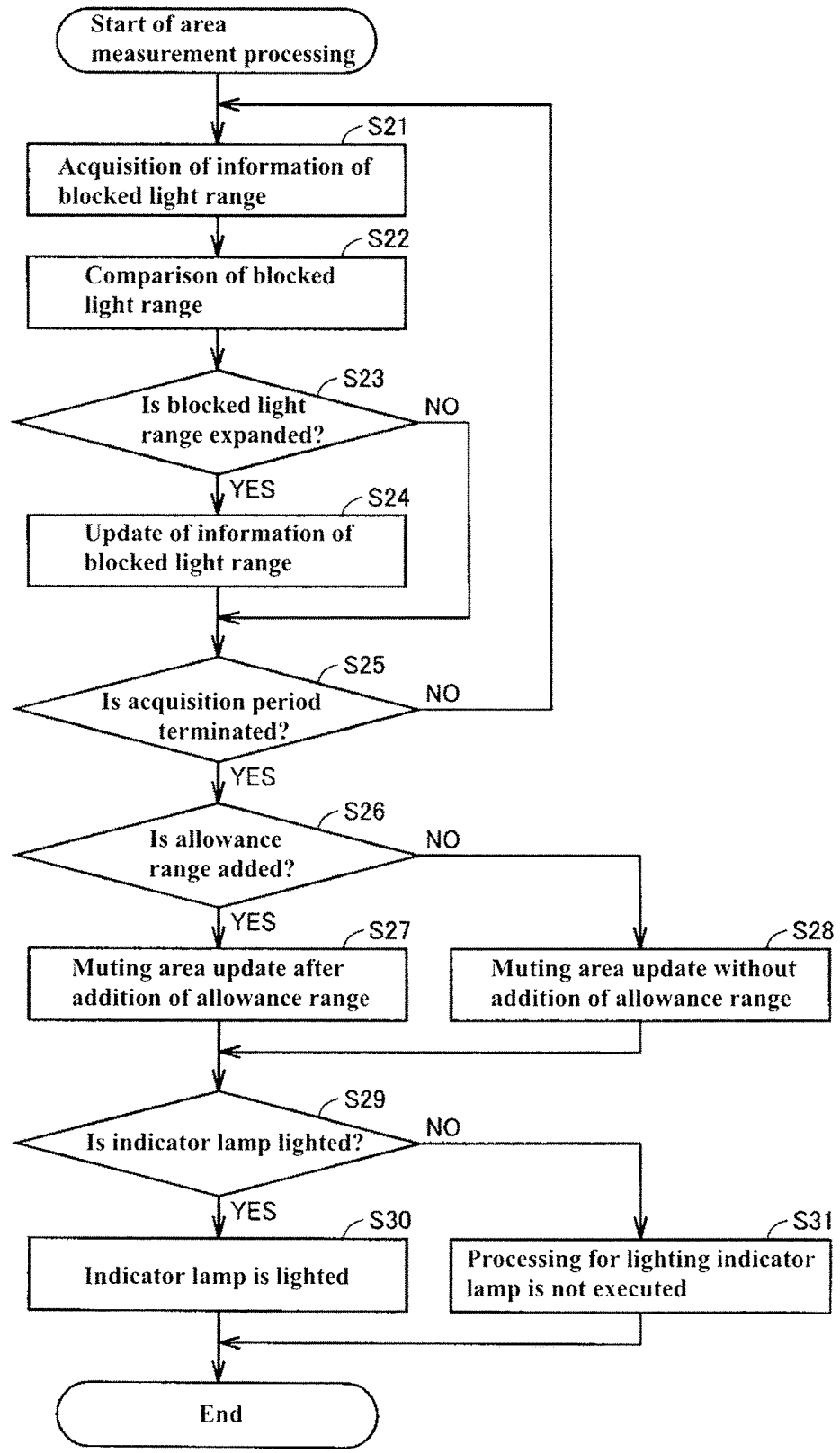
FIG. 16 is a flowchart showing an example of a muting area determination processing according to the embodiment of the present invention.

FIG. 16 shows a flowchart showing one example of a muting area determination processing according to the embodiment of the present invention. As shown in FIG. 16, once the processing is initiated, the information of the blocked light range is acquired (step S21). In step S21, the maximum of the optical axis number and the minimum of the optical axis number in the range of blocked light are acquired. Namely, in the detection area LC, the range of blocked light corresponding to the blocked optical axes is acquired.

Next, the range of blocked light is compared (step S22). For example, the range of blocked light acquired by the preceding processing cycle is compared with the range of blocked light acquired by the current cycle.

On the basis of comparing the ranges of blocked light, a determination is made as to whether or not the range of blocked light is expanded (step S23). For example, the range of blocked light is determined to be expanded, if the maximum of the optical axis number in the current cycle is smaller than that in the preceding cycle, or if the minimum of the optical axis number in the current cycle is larger than that in the preceding cycle.

When the range of blocked light is expanded (YES in step S23), the information of the blocked light range is updated to the information acquired in the current cycle (step S24). When the range of blocked light is not expanded (NO in step S23), the processing in step S24 is skipped.

Next, a determination is made as to whether or not the acquisition period for acquiring the range of blocked light is terminated (step S25). When the acquisition period is not terminated (NO in step S25), the processing is returned to step S21.

When the acquisition period is terminated (YES in step S25), a determination is made as to whether or not the allowance range (either one or both of the allowance ranges M1 and M2) is added to the muting area corresponding to the range of blocked light (step S26). The criterion for the determination of whether or not the allowance range is added is not particularly limited. For example, the determination of whether or not the allowance range is added may be made according to the settings of the multiple optical axis photoelectric sensor SNS.

If it is determined that the allowance range should be added to the muting area corresponding to the range of blocked light (YES in step S26), the allowance range is added to the muting area corresponding to the range of blocked light, and the muting area is updated (step S27). Meanwhile, if it is determined that the allowance range does not need to be added to the muting area corresponding to the range of blocked light (NO in step S26), the muting area is updated without the addition of the allowance range to the muting area corresponding to the range of blocked light (step S28).

In the processes in step S27 and step S28, the muting area is updated. Therefore, the muting area is altered from the first range to the second range. Next, a determination is made as to whether or not the indicator lamps 10, 20 are to be lighted, on the basis of the acquisition result of the range of blocked light (step S29).

For example, when the acquired range of blocked light is not within a predetermined range, it is determined that the indicator lamps 10, 20 are to be lighted. It may be determined that the indicator lamps 10, 20 are to be lighted, if the size of the acquired range of blocked light surpasses the size of a reference range.

If it is determined that the indicator lamps 10, 20 are to be lighted (YES in step S29), for example due to the above conditions, the processing is executed for lighting the indicator lamps 10, 20 (step S30). The indicator lamps 10, 20 may be simply lighted, or indicate the kind of error by differentiating the way of lighting the indicator lamps 10, 20 (for example, consecutive lighting or flashing). Meanwhile, if it is determined that the indicator lamps 10, 20 are not to be lighted (NO in step S29), the processing is not executed for lighting the indicator lamps 10, 20 (step S31).

The muting termination section 35 terminates the muting state when the requirement of muting termination is satisfied. If the indicator lamps 10, 20 are lighted, the indicator lamps are then turned off. Moreover, the muting termination section 35 causes the state of the muting determination section 32 to a standby state, in preparation for approach of next workpiece W. Afterwards, when a new workpiece W is conveyed toward the multiple optical axis photoelectric sensor SNS, the muting initiation section 33 executes the muting initiation processing again. When light is blocked by the workpiece W, the muting altering section 34 executes the processing of altering the muting area adapted to the workpiece W.

With this processing, in the embodiment of the present invention, the muting altering section 34 (see FIG. 5) acquires the range of blocked light while the workpiece W passes through the detection area LC. After the acquisition period for acquiring the range of blocked light is terminated, the muting altering section 34 alters the muting area dynamically on the basis of the acquisition result. The muting area (initial area) to be altered can be selected from the entire detection area, and a part of the detection area depending on the initial setting, for example.

According to the embodiment of the present invention, it is not necessary to set up a plurality of muting areas according to different workpiece shapes in the multiple optical axis photoelectric sensor. Therefore, it does not necessitate an additional means for switching the muting area according to different workpiece shapes.

In addition, it is not necessary for the user approach the detection area in order to switch the muting area. This will be advantageous for the user's safety.

Therefore, according to the embodiment of the present invention, it is possible to perform the muting processing while guaranteeing both safety and productivity in the facility where workpieces with different heights are present.

Figure 17:
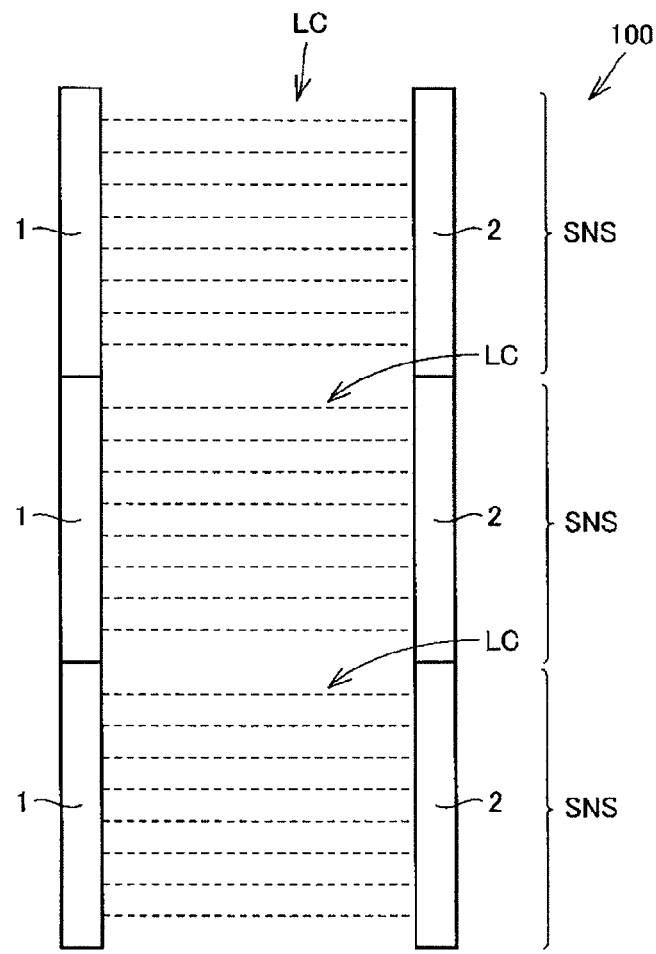
FIG. 17 is a schematic view which schematically shows another configuration example of the sensor system including the multiple optical axis photoelectric sensor according to an embodiment of the present invention.

As shown in FIG. 17, it is possible to form a combined detection area by disposing (connecting, for example) a plurality (three in FIG. 17, but the number is not limited to three) of the light projecting devices 1 of the multiple optical axis photoelectric sensor SNS in series while disposing (connecting, for example) a plurality of the light receiving devices 2 in series. One possible configuration in this case employs a plurality of multiple optical axis photoelectric sensors SNS, which operate independently from each other. Each of the output sections of the multiple optical axis photoelectric sensors outputs a signal according to the light-blocking states of its optical axes. In machines and the like receiving this signal, light may be determined to be blocked in the combined detection area, if any of the signals indicates the state "detection". The muting explained above in this description can be executed independently in each of the multiple optical axis photoelectric sensors.

In another possible configuration in which the light projecting devices 1 of a plurality of multiple optical axis photoelectric sensors SNS are disposed in series while also their light receiving devices 2 are disposed in series, the plurality of the multiple optical axis photoelectric sensors are configured to communicate with each other so as to operate unitarily as if they were a single multiple optical axis photoelectric sensor. The first aspect of the unification refers to sequential activation of the optical axes (light projecting and light receiving) in the entire combined detection area so as not to activate a plurality of optical axes simultaneously. With this arrangement, it is possible to prevent the generation of interference between the plurality of optical axes. Such a control can be easily achieved by activating sequentially the respective optical axes in a single multiple optical axis photoelectric sensor, sending a signal to another multiple optical axis photoelectric sensor after one cycle of the activation, and then initiating the sequential activation of the optical axes in the other multiple optical axis photoelectric sensor. It is possible to determine whether or not the first aspect is executed, independently from determination of whether or not the second aspect and third aspect described below are executed.

The second aspect of the unification refers to the unification of output signals. The controller 6 in any one of the multiple optical axis photoelectric sensors serves as an output section, has the same communication circuit (communication section) not shown in the drawings as the communication circuit 17 and the communication circuit 28, and is capable of communicating with another multiple optical axis photoelectric sensor (for example, the light projecting device and the light receiving device thereof). The controller 6 combines the determination results of blocked light for the optical axes of the multiple optical axis photoelectric sensors to be unified, and then outputs the detection signal. For example, when any one of the optical axes is in the light-blocking state, the signal indicating the state "detection" is output. As it is possible to unify the controllers 6 in the unified plurality of multiple optical axis photoelectric sensors, the number of the controllers 6 is not necessarily two or more even if there is a plurality of multiple optical axis photoelectric sensors.

The third aspect of the unification refers to the unification of the muting. In case of unifying the muting, some of the muting initiating sections 33 of the multiple optical axis photoelectric sensors select optical axes in the whole or a part of the range (third range) in the combined detection area as optical axes to be muted. In addition, the muting altering sections 34 in some of the multiple optical axis photoelectric sensors select optical axes in a range (fourth range) including the range of the blocked optical axes in the whole or a part of the range (third range), as optical axes to be muted thereafter, according to the light blocking states of the optical axes during the muting.

In case the acquired range of blocked light does not satisfy the requirement (for example, in case the size of the acquired range of blocked light differs from the predetermined size), the processing is not limited to the lighting of the indicator lamp (step S29 in FIG. 16). For example, processing for making sounds with a sound generation device (speaker, buzzer and the like) may be executed. Alternatively, a signal indicating error may be output from a sensor system. In addition, these processes can be combined with each other. It is possible to employ various well-known means for announcing that the acquired range of blocked light does not satisfy the requirement to users.

It should be understood that the embodiments disclosed herein are illustrative and non-restrictive in every respect. The scope of the present invention is defined by the terms of the claims, and is intended to include any modifications within the scope and meaning equivalent to the terms of the claims.

1 Light projecting device
2 Light receiving device
3 Dedicated cord
4 Communication unit
5 Personal computer
6 Controller (output section)
10, 20 Indicator lamp
11 Light emitting element
11_U, 11_D, 11_T1, 11_T2, 11_P Optical axes
12 Driving circuit
13, 25 Optical axis sequence selection circuit
15 External power source
16 Light projecting device processing circuit
17, 27, 37 Communication circuit
18, 28, 38 Power source circuit
21 Light receiving element
22, 24 Amplifier
23 Switch
26 Light receiving device processing circuit
26A Light blocking determination section
29 Muting processing circuit
30, 31 OR circuit
32 Muting determination circuit
33 Muting initiating section
34 Muting altering section
35 Muting terminating section
36 Control circuit
39 Communication conversion device
51 Control section
53 Storage section
55 Input section
57 Indicator section
59 External storage device
61 Record medium
100 Sensor system
101 Communication cable
102 Branch connector A1, A2, B1, B2 Muting sensor
D Arrow
LC Detection area
M1, M2 Tolerance range
P, P1, P2 Pallet
RD Transport path
SNS Multiple optical axis photoelectric sensor
W workpiece
nA, nB Input port

The invention claimed is:

1. A multiple optical axis photoelectric sensor (SNS) for detecting an object to be detected, which is conveyed by a conveyance device, the multiple optical axis photoelectric sensor (SNS) comprising:
a light projecting device having a plurality of light projecting elements which are arrayed in a line,
a light receiving device having a plurality of light receiving elements which are disposed to face the light projecting elements,
light blocking determination circuitry configured to perform a light blocking determination of whether or not any optical axes formed between opposed light projecting elements and light receiving elements are in a light blocking state,
a controller configured to output a detection signal on the basis of a result of the light blocking determination, and
muting processing circuitry configured to perform muting so as not to output the detection signal even though a subset or all of the optical axes are in a light blocking state,
wherein the muting processing circuitry comprises:
muting initiating circuitry configured to initiate the muting of the optical axes in a first range in response to a signal input from an external muting device indicating that the object to be detected is conveyed toward the multiple optical axis photoelectric sensor (SNS), and
muting altering circuitry configured to select, as the optical axis to be muted thereafter, the optical axes in a second range that includes all blocked optical axes of the first range, the muting altering circuitry being configured to select the optical axis in the second range depending on the light blocking state of the optical axes in the first range while the optical axes in the first range are muted, and the muting altering circuitry is configured to acquire the range of the blocked optical axes during an acquisition period for acquiring a blocked light range.

2. The multiple optical axis photoelectric sensor (SNS) according to claim 1, wherein the acquisition period for acquiring the blocked light range is initiated when any of the optical axes is blocked.

3. The multiple optical axis photoelectric sensor (SNS) according to claim 1, wherein the acquisition period for acquiring the blocked light range is initiated by a trigger signal input from outside.

4. The multiple optical axis photoelectric sensor (SNS) according to claim 1, wherein the acquisition period for acquiring the blocked light range is controlled by a control signal input from outside.

5. The multiple optical axis photoelectric sensor (SNS) according to claim 1, wherein the second range includes a maximum blocked light range which is acquired during the acquisition period for acquiring the blocked light range.

6. The multiple optical axis photoelectric sensor (SNS) according to claim 1, wherein the first range is a range corresponding to all of the optical axes.

7. The multiple optical axis photoelectric sensor (SNS) according to claim 1, wherein the first range is a range corresponding to a predetermined number of the optical axes.

8. The multiple optical axis photoelectric sensor (SNS) according to claim 1,
wherein a first multiple optical axis photoelectric sensor serving as the multiple optical axis photoelectric sensor is further provided with communication circuitry for communication with a second multiple optical axis photoelectric sensor,
wherein the light projecting devices are disposed in series together with light projecting devices of the second multiple optical axis photoelectric sensor, and the light receiving devices are disposed in series with light receiving devices of the second multiple optical axis photoelectric sensor,
wherein, when the communication circuitry has been set to be capable of communicating with the second multiple optical axis photoelectric sensor:
the controller is configured to be capable of outputting a detection signal by combining the result of the light blocking determination with a result of light blocking determination for the second multiple optical axis photoelectric sensor which is acquired by way of the communication circuitry,
wherein the muting initiating circuitry is configured to be capable of selecting the optical axes in a third range, which is the entire or a subset of an optical axis group including all of the optical axes and all of the optical axes of the second multiple optical axis photoelectric sensor, as optical axes to be muted, and
wherein the muting altering circuitry is configured to be capable of selecting the optical axes in a fourth range, which includes a range of the blocked optical axes in the entire or a subset of the third range, as the optical axes to be muted thereafter, depending on the light blocking state of the optical axes in the third range while muting the optical axes in the third range.

9. The multiple optical axis photoelectric sensor (SNS) according to claim 2, wherein the length of the acquisition period for acquiring the blocked light range is a time that is a fixed time, a set time, or a time that is determined in accordance with information indicating a speed, a length or a passage time of the object to be detected.

10. The multiple optical axis photoelectric sensor (SNS) according to claim 3, wherein the length of the acquisition period for acquiring the blocked light range is a time that is a fixed time, a set time, or a time that is determined in accordance with information indicating a speed, a length or a passage time of the object to be detected.

11. The multiple optical axis photoelectric sensor (SNS) according to claim 5, wherein the second range includes an additional range corresponding to one optical axis added to either side of the maximum blocked light range.

* * * * *